US012598075B2

(12) United States Patent
Kornegay et al.

(10) Patent No.: US 12,598,075 B2
(45) Date of Patent: Apr. 7, 2026

(54) DETECTION AND SURVIVAL METHOD AGAINST ADVERSARIAL ATTACKS ON AUTOMATED SYSTEMS

(71) Applicant: Morgan State University, Baltimore, MD (US)

(72) Inventors: Kevin Kornegay, Towson, MD (US); Tsion M. Yimer, Essex, MD (US); Edmund H. Smith, Baltimore, MD (US)

(73) Assignee: Morgan State University, Baltimore, MD (US)

( * ) Notice: Subject to any disclaimer, the term of this patent is extended or adjusted under 35 U.S.C. 154(b) by 244 days.

(21) Appl. No.: 18/419,037

(22) Filed: Jan. 22, 2024

(65) Prior Publication Data

US 2024/0250824 A1 Jul. 25, 2024

Related U.S. Application Data

(60) Provisional application No. 63/440,170, filed on Jan. 20, 2023.

(51) Int. Cl.
  *H04L 9/32* (2006.01)
  *H04L 9/08* (2006.01)

(52) U.S. Cl.
  CPC .......... *H04L 9/3236* (2013.01); *H04L 9/0869* (2013.01); *H04L 9/3278* (2013.01)

(58) Field of Classification Search
  CPC ... H04L 9/3236; H04L 9/0869; H04L 9/3278; H04L 63/14; G06F 21/57
  See application file for complete search history.

(56) References Cited

U.S. PATENT DOCUMENTS

2012/0297461 A1* 11/2012 Pineau ................ H04L 63/0815
                                                        726/4
2017/0126745 A1*  5/2017 Taylor ................ H04L 63/0227
                      (Continued)

OTHER PUBLICATIONS

Quan Liu et al., Study of Wireless Ad Hoc Network Based on MS/TP, IEEE (Year: 2008).*
                      (Continued)

*Primary Examiner* — Shanto Abedin
(74) *Attorney, Agent, or Firm* — Whiteford, Taylor & Preston, LLP; Peter J. Davis

(57) ABSTRACT

Methods provide device authentication for an intrusion detection system implementing building automation and control network (BACnet) Master-Slave/Token-Passing (MS/TP). An authentication protocol provides countermeasures to vulnerabilities in the BACnet MS/TP physical layer by utilizing an extended message format to cloak device identifiers (IDs). Adversaries are prevented from using known device IDs to gain access to the network. An authenticating device hashes a device identifier of a device to be authenticated combined with a random number. The authenticating device receives a hash of the random number plus the device identifier from the device. The authenticating device compares the hashes and authenticates the device if the hashes match. To transmit the hash, the BACnet MS/TP frame format includes an extended header cyclic redundancy check (CRC) field having bytes reallocated from the data field of the frame format. Another countermeasure utilizes a physical unclonable function (PUF) of the device in the extended header CRC.

15 Claims, 12 Drawing Sheets

(56) References Cited

U.S. PATENT DOCUMENTS

| | | | | |
|---|---|---|---|---|
| 2018/0121662 A1* | 5/2018 | Pelton | .................. | H04L 9/0869 |
| 2018/0234249 A1* | 8/2018 | Haase | ................ | H04L 63/0442 |
| 2020/0117795 A1* | 4/2020 | Sasson | ................. | H04L 9/3278 |
| 2022/0292343 A1* | 9/2022 | Manuel-Devadoss | ...................... | |
| | | | | H04L 63/104 |
| 2025/0233882 A1* | 7/2025 | Anand | ................... | G06F 21/44 |

OTHER PUBLICATIONS

Tsion Yimer et al., Error Correction Attacks on BACnet MS/TP, IEEE (Year: 2022).*

* cited by examiner

500

600

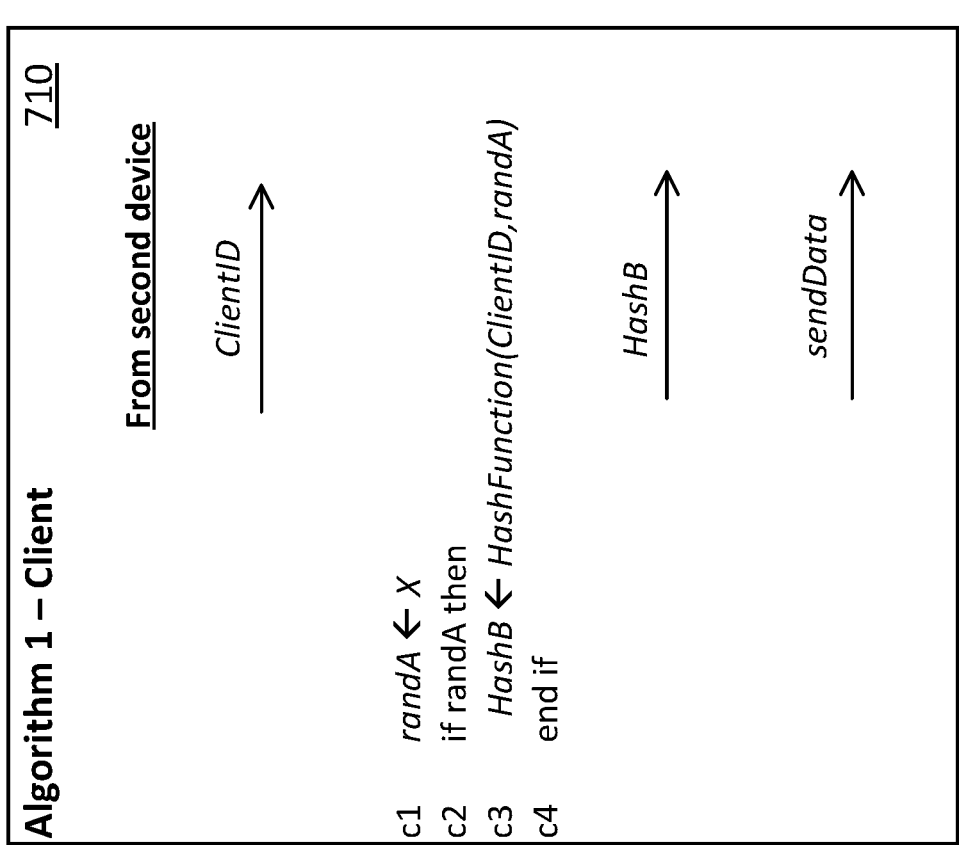

Algorithm 2 – Server     <u>720</u>

<u>At first device</u>

1:    *ID ← ClientID*     - Initiate client authentication

2:    *t ← 1*    
3:    *X ← Rand(n)*     - Send rand to client
     ← X

4:    while *HashB & ClientID* do
5:      *HashA ← HashFunction(ClientID,X)*
6:    if *HashA = HashB* then
7:      *data ← receiveData(ClientID)*
8:    end if
9:    end while

Algorithm 1 – Client     <u>710</u>

<u>From second device</u>

*ClientID* → c1   *randA ← X*
c2   if *randA* then
c3    *HashB ← HashFunction(ClientID,randA)*
c4   end if

*HashB* →

*sendData* →

FIG. 7

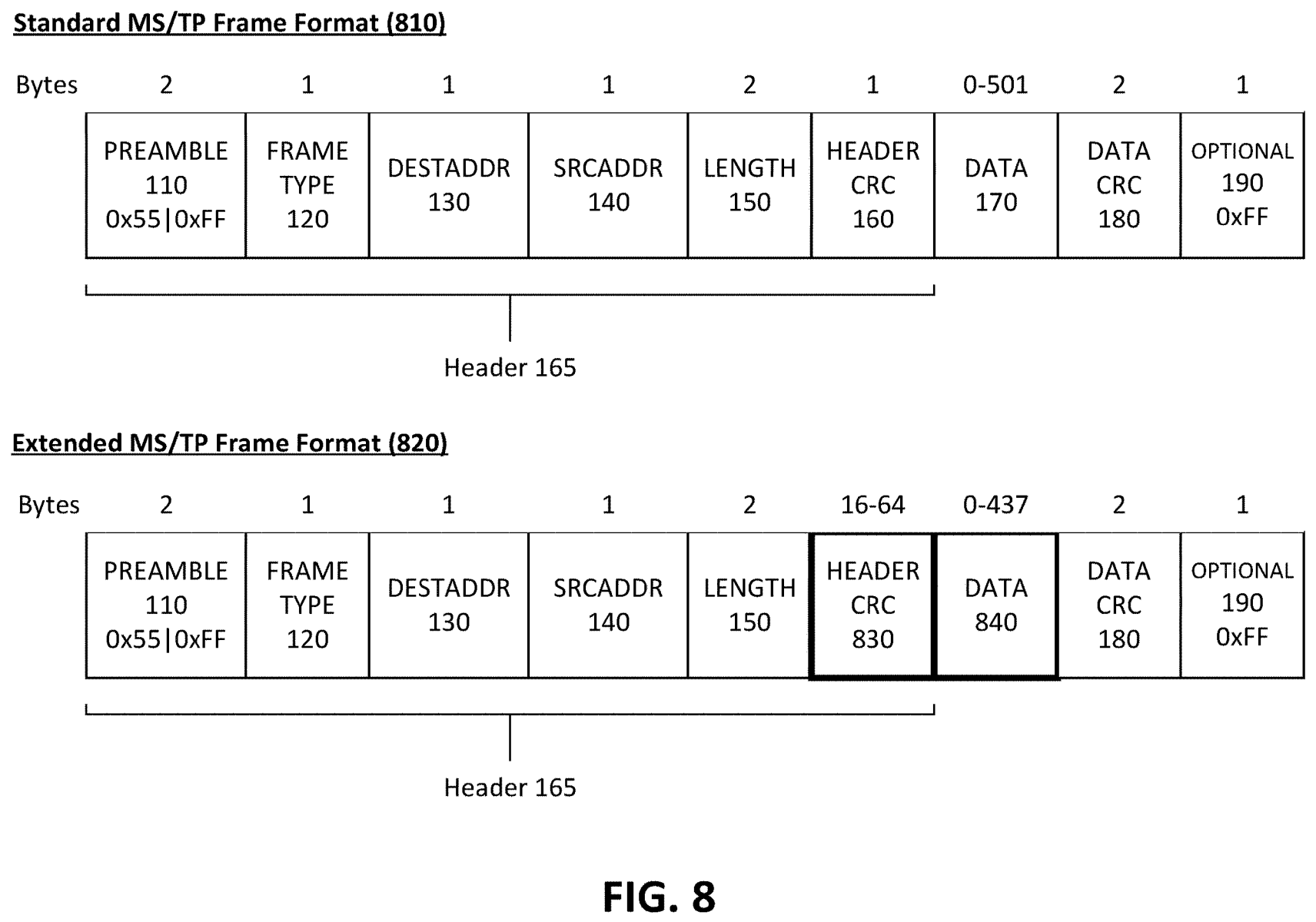

Standard MS/TP Frame Format (810)

| Bytes | 2 | 1 | 1 | 1 | 2 | 1 | 0-501 | 2 | 1 |
|---|---|---|---|---|---|---|---|---|---|
| | PREAMBLE 110 0x55\|0xFF | FRAME TYPE 120 | DESTADDR 130 | SRCADDR 140 | LENGTH 150 | HEADER CRC 160 | DATA 170 | DATA CRC 180 | OPTIONAL 190 0xFF |

Header 165

Extended MS/TP Frame Format (820)

| Bytes | 2 | 1 | 1 | 1 | 2 | 16-64 | 0-437 | 2 | 1 |
|---|---|---|---|---|---|---|---|---|---|
| | PREAMBLE 110 0x55\|0xFF | FRAME TYPE 120 | DESTADDR 130 | SRCADDR 140 | LENGTH 150 | HEADER CRC 830 | DATA 840 | DATA CRC 180 | OPTIONAL 190 0xFF |

Header 165

FIG. 8

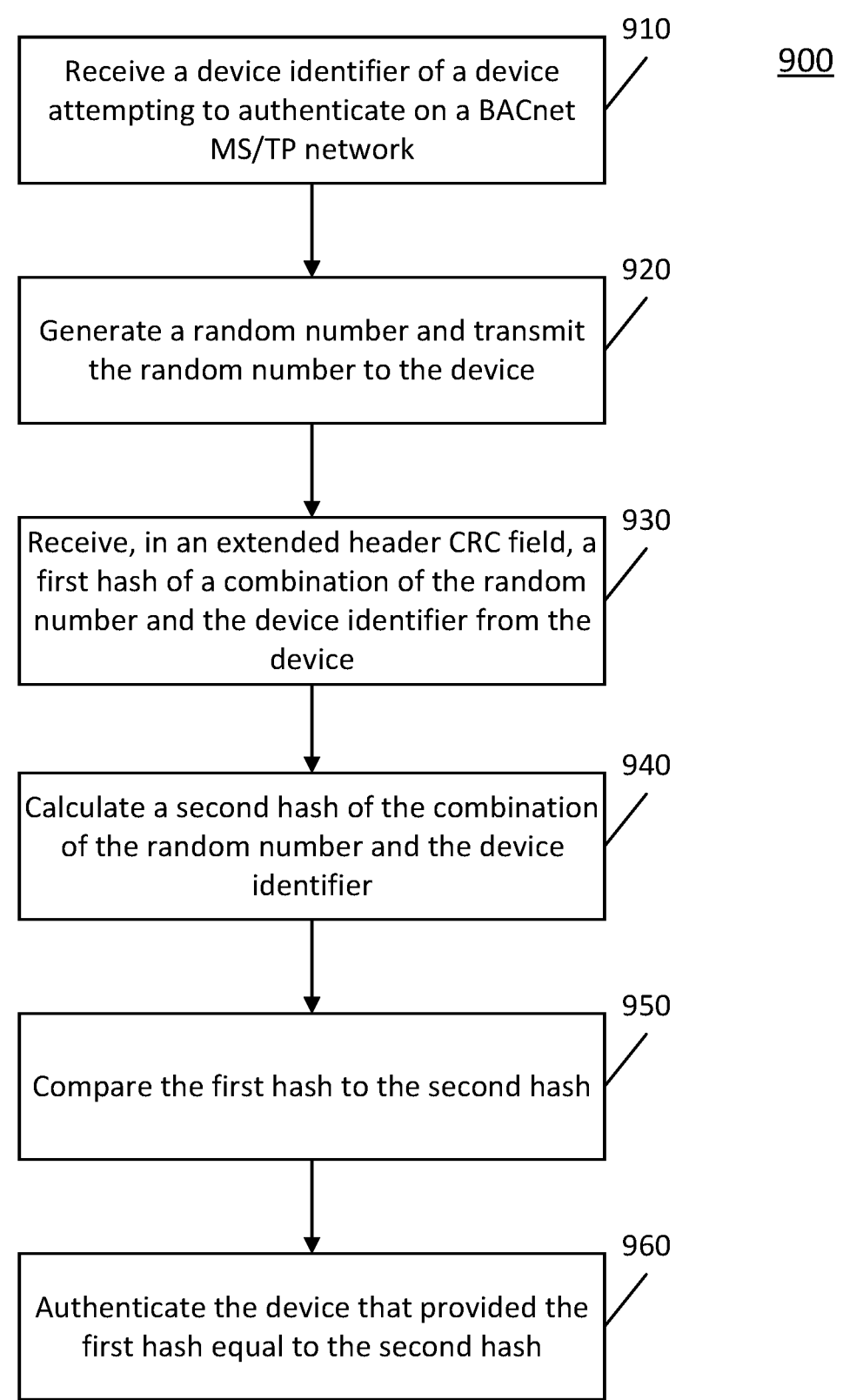

900

910 — Receive a device identifier of a device attempting to authenticate on a BACnet MS/TP network 920 — Generate a random number and transmit the random number to the device 930 — Receive, in an extended header CRC field, a first hash of a combination of the random number and the device identifier from the device 940 — Calculate a second hash of the combination of the random number and the device identifier 950 — Compare the first hash to the second hash 960 — Authenticate the device that provided the first hash equal to the second hash

Receive, in an extended header CRC field, a physical unclonable function (PUF) of a device attempting to authenticate on a BACnet MS/TP network

1010

Compare the PUF to a known PUF for the device

1020

Authenticate the device that provided the PUF equal to a known PUF of the device

1030

1200

DETECTION AND SURVIVAL METHOD AGAINST ADVERSARIAL ATTACKS ON AUTOMATED SYSTEMS

CROSS-REFERENCE TO RELATED APPLICATIONS

This application is based upon and claims the benefit of U.S. Provisional Application No. 63/440,170 titled "Detection and Survival Method Against Adversarial Attacks on Automated Systems," filed with the United States Patent & Trademark Office on Jan. 20, 2023, the specification of which is incorporated herein by reference in its entirety.

FIELD OF THE INVENTION

The present invention relates to detection and prevention of adversarial attacks on automated systems. More specifically, the present invention relates to methods and systems to detect and prevent cyber threats and intrusions on BACnet devices in MS/TP networks for industrial control systems.

BACKGROUND OF THE INVENTION

Industrial Control Systems (ICS) are critical in ensuring the efficient operation of various industrial processes. However, their increasing connectivity and integration with modern technologies have exposed them to a higher risk of cyber threats and intrusions. The rapid growth in connected technology and attack surfaces have increased significantly, especially in the Industrial Internet of Things (IIoT) domain.

Building automation and control network (BACnet) is one of the most popular protocols for merging various systems and automating buildings. With the advancement of IIoT technology, the use of BACnet has proliferated and will continue to do so. However, BACnet has security challenges, and there is a lack of standards for addressing these security challenges. For example, adversaries pose potential threats to BACnet Master-Slave/Token-Passing (MS/TP) networks. By exploiting vulnerabilities in the physical layer, attackers can disrupt BACnet systems remotely or through direct physical access. There is a lack of device authentication protocols for preventing such attackers from gaining access.

Building automation systems (BAS) is a subset of ICS used for building automation. BACnet is a widely used protocol for BAS network control systems. Specifically, edge node devices, such as heating, ventilating, and air-conditioning (HVAC) systems, communicate via a BACnet protocol. BACnet is a communication protocol and global communication standard developed by the American Society of Heating, Refrigerating, and Air-Conditioning Engineers (ASHRAE) Standing Standards Project Committee (SSPC) 135 that allows interoperability between automation devices and co-operating buildings. BACnet provides a flexible series of networking alternatives, such as applying BACnet over IP (Internet Protocol), BACnet over ZigBee (Zonal Intercommunication Global-standard), Ethernet infrastructure, and MS/TP communications protocol.

BACnet is based on a four-layer architecture that corresponds to the Open Systems Interconnection (OSI) model having physical, data link, network, and application layers. Each layer is responsible for a different aspect of communication on the network. The physical layer is responsible for transmitting data over the network. The physical layer defines the electrical characteristics of the RS-485 network, including voltage levels, signaling rate, and cable length.

The data link layer is responsible for framing data into packets called frames. The data link layer also manages access to the network, using a MS/TP scheme to ensure that only one device can transmit at a time. The network layer is responsible for routing frames between devices on the network. The network layer uses a simple addressing scheme to identify devices and route frames to their intended destination. Finally, the application layer is responsible for defining the structure and content of the data being transmitted. The application layer includes a wide range of standard objects and services that can be used to control and monitor building automation systems. The application layer also handles the user's application program interface and checks reliability and data errors. Additionally, the application layer contains an object identifier to determine whether a connected device is analog or digital and to specify the vendor identity.

BACnet is a wired protocol that communicates across several different network types, such as IP or MS/TP network types. In an MS/TP network, devices communicate by sharing a specific message called a token. A controller must request a token to transmit messages. The controller can send its signal along with the token to target devices. This allows master devices to initiate services while slave devices respond and execute the services. Baud rates, clock synchronization, and sequential addressing are important in BACnet MS/TP because all MS/TP devices on a trunk need to have synchronized operation.

There are three layers in a BAS: field layer, automation layer, and management layer. The automation layer in buildings includes a central supervisor and controllers that manage and monitor field layer devices. The automation layer connects a smart building's lower and upper levels of distributed information systems. One of the threats to the automation layer involves automation network traffic monitoring. Vulnerability in the automation layer may compromise operational networks, such as BACnet or LonWorks, and physical access to automation devices. Further, as will be illustrated in more detail, vulnerabilities can be inherent at the BAS field layer, especially due in part to the specific communication protocol of a BACnet MS/TP network. The field layer of a BAS involves how actuators and sensors pass information through controllers without sending the data to higher layers. Some field-level security threats involve physical disconnection of controller devices and manipulation of security sensors. For example, controllers and sensors on a BACnet MS/TP bus can be easily accessible to potential bad actors due to security vulnerabilities of ICS communication protocols over the BACnet data link layer.

In an MS/TP network, BACnet devices use a daisy-chain network topology to communicate and transfer data in series, thus making the network more vulnerable and less resilient. Further, BACnet MS/TP provides minimal defense against security threats/risk in a conventional system. For data exchange, the BACnet MS/TP communication system uses RS-485 as its standard physical layer.

Still further, modern buildings rely on various automated subsystems for access control, surveillance, and energy management, such as HVAC, lighting, alarm, elevator, and security (access control) subsystems, each potentially having their own subnetworks. Each of these smart building subsystems use various sensors, actuators, controllers, and supervision devices or software. Physical devices in a BAS collect information from these various sensors, using the data collected to control potentially differing physical environments. Moreover, these sensors, actuators, and controllers are mounted in ceilings, behind walls, or inside machines all over a building. Advanced building automation and control systems require real-time monitoring of these disparate systems powered by an integrated network-based control system. However, many vendors provide products and solutions for automated building systems that use a vendor-specific networking technology, which creates a problem for building owners integrating building automation systems that different vendors supply. A BAS's control system must conduct and integrate the tasks of these subsystems in this challenging environment. Yet for many years, the challenge posed by such gaps in intelligent building systems has persisted.

BACnet has known vulnerabilities in its communication protocol. For example, BACnet design does not require authentication and authorization to access and interact with BACnet devices. Because BACnet is an open protocol, anyone can download the standard and learn how to create a device that can interact with all other BACnet devices in the network. Therefore, a request or query over the BACnet network could result in information release or data leakage independently or regardless of credentials. BACnet may also lack data integrity based on limited data authentication checks within the protocol itself. As later explained with regard to FIGS. 1 and 2, the limitations of BACnet MS/TP data integrity checks may allow a malicious actor to manipulate BACnet MS/TP data frames to craft malicious packets while producing a correct cyclic redundancy check (CRC) error detection value, such that there is no actual authentication check as long as the CRC is correct.

For these and other reasons, conventional hardware or network-based solutions have been challenged to secure BACnet MS/TP devices against adversarial attacks on BAS security. For example, a security weakness in temperature sensing and control system security can lead to exploiting and hijacking critical systems. Tu et al. analyzed the safety and security of sensors in temperature-based control systems and demonstrated how to manipulate the DC voltage of temperature sensors and signals through exploitation of a rectification phenomenon. See Yazhou Tu, Sara Rampazzi, Bin Hao, Angel Rodriguez, Kevin Fu, and Xiali Hei, *Trick or heat? Manipulating critical temperature-based control systems using rectification attacks*, Proceedings of the 2019 ACM SIGSAC Conference on Computer and Communications Security, 2301-2315.

Zheng et al. identified that field-layer devices have vulnerabilities that allow false commands to be sent to physical devices that nonetheless report typical sensing values. See Zhiyuan Zheng and AL Narasimha Reddy, *Towards improving data validity of cyber-physical systems through path redundancy*, 2017, Proceedings of the 3rd ACM Workshop on Cyber-Physical System Security, 91-102.

Giraldo et al. identified that attacks on Industrial Control Systems have been increasing, where attackers have been exploiting a trend of building control systems typically using of a small number of sensors to control a system for economic and efficiency reasons. See Jairo Giraldo, David Urbina, CheeYee Tang, and Alvaro A Cardenas, *The more the merrier: adding hidden measurements to secure industrial control systems*, 2020, Proceedings of the 7th Symposium on Hot Topics in the Science of Security, 1-10.

Advantageously, methods of attack have their own vulnerabilities that can be modeled and verified, and network-based and physical security countermeasures can be developed. Some countermeasures have been developed with varying degrees of success. For example, Zheng proposed path redundancy to improve data validity and developed countermeasures to detect false commands sent to PLCs.

Giraldo proposed a technique that employs measurements to detect anomalies between operational and hidden sensors and introduced a mitigation strategy to use the hidden sensors to respond to attacks. Further, U.S. Pat. No. 9,177, 139 describes a control system that determines whether measurements from sensing and actuating devices are associated with a cyberattack. Still further, U.S. Patent Publication No. 2021/0263830 involves the assessment of software that might cause harm to an industrial automation/control system. However, developing new techniques to mitigate vulnerability exploitation has been a challenge because ICSs have lacked reliability in communication between sensors and edge node devices.

Countermeasures include vulnerability assessment and risk detection. However, insufficient attention has been paid to field-level security threats in a BAS, specifically as concerns the BACnet data link layer. Thus, there is a need for effective countermeasures at the physical device layer for unauthorized access to BACnet networks and applications.

SUMMARY OF THE INVENTION

The present invention detects anomalies caused by malicious actors that eavesdrop on normal communications between a controller and a sensor in an automated ICS, such as an HVAC system, in an attempt to hijack the automated ICS. Methods and systems provide countermeasures to maintain effective system operation. Specifically, embodiments of methods and systems provide for secure BACnet device communication and verification for MS/TP networks.

In some embodiments, a BACnet MS/TP system identifies security vulnerabilities of ICS communication protocols. An Intrusion Detection System (IDS) is provided to monitor network or host resources to detect intrusions and attacks. Embodiments of the IDS use tree-based algorithms that accommodate the distinctive characteristics of BACnet devices inside MS/TP networks. Some embodiments of an automated IDS provide a physical plus virtual configuration to ward off attacks by malicious actors. Vulnerabilities in the BACnet MS/TP protocol are analyzed via threat models applied to an example BACnet ICS.

In some embodiments, an intrusion detection method designed for BACnet MS/TP networks addresses the challenges posed by the complex and dynamic nature of ICS environments. In some embodiments, a physical/hardware security technique applied to an example IDS can efficiently detect attacks and verify the trustworthiness of sensors in a BACnet system based on machine-learned models, e.g., tree-based models, including decision trees (DT), random forests (RF), logistic regression (LR), and k-nearest neighbors (KNN). The example IDS provides intrusion detection performance metrics for DT, RF, LR, and KNN of 100%, 100%, 98%, and 98%, respectively.

Embodiments described herein improve the overall security for BACnet systems by addressing (1) the processes and operational technologies that are needed for trusted and reliable communication with other MS/TP devices; and (2) the anomaly detection and physical security mitigation strategies in operating environments where information exchanges occur.

In accordance with certain aspects of an embodiment of the invention, a first method of authenticating a device on a BACnet MS/TP network includes receiving, by a processor of an authenticating device, a device identifier of the device; generating, by the processor, a random number; transmitting, by the processor, the random number to the device; receiving, by the processor, a first hash of a combination of the random number and the device identifier from the device; calculating, by the processor, a second hash of the combination of the random number and the device identifier; comparing, by the processor, the first hash to the second hash; and authenticating, by the processor, the device that provided the first hash equal to the second hash, wherein the first hash is communicated over the BACnet MS/TP network in a BACnet MS/TP message having a frame format comprising a header cyclic redundancy check (CRC) field extended in length by additional bytes to accommodate the length of the first hash, the additional bytes reallocated from the length of a data field of the frame format. The first method may further include, upon authenticating the device, receiving, by the processor, payload data from the device.

Optionally, in the first method, the additional bytes of the header CRC field may be 16 to 64 bytes, and the length of the data field may be 0 to 437 bytes, so that the maximum sum of the additional bytes and the length of the data field is 501 bytes. The payload data may be BACnet Data Expecting Reply or BACnet Data Not Expecting Reply. The authenticating device may be a Variable Air Volume (VAV) Modular Assembly (VMA) controller of a building automation system (BAS), and the device may be a remote sensor of the BAS, where the remote sensor may be a temperature sensor, a light sensor, an alarm controller, an elevator controller, a motion sensor, a heating, ventilating, and air-conditioning (HVAC) sensor, or a combination thereof.

In accordance with aspects of a second embodiment of the invention, a second method of authenticating a device on a BACnet MS/TP network includes receiving, by a processor of an authenticating device, a physical unclonable function (PUF) of the device; and authenticating, by the processor, the device that provided the PUF equal to a known PUF of the device, wherein the PUF is communicated over the BACnet MS/TP network in a BACnet MS/TP message having a frame format comprising a header cyclic redundancy check (CRC) field extended in length by additional bytes to accommodate the PUF length, the additional bytes reallocated from the length of a data field of the frame format. The second method may further include, upon authenticating the device, receiving, by the processor, payload data from the device.

Optionally, in the second method, the additional bytes of the header CRC field may be 16 to 64 bytes, and the length of the data field may be 0 to 437 bytes, so that the maximum sum of the additional bytes and the length of the data field is 501 bytes. The payload data may be BACnet Data Expecting Reply or BACnet Data Not Expecting Reply. The authenticating device may be a Variable Air Volume (VAV) Modular Assembly (VMA) controller of a building automation system (BAS), and the device may be a remote sensor of the BAS, where the remote sensor may be a temperature sensor, a light sensor, an alarm controller, an elevator controller, a motion sensor, a heating, ventilating, and air-conditioning (HVAC) sensor, or a combination thereof. Further, the second method may include transmitting a notification to a building automation system operator when the PUF is different from the known PUF.

In accordance with aspects of a third embodiment of the invention, a first system for device authentication on a BACnet MS/TP network includes a first device comprising a first processor and a first memory storing computer-executable instructions that, when executed by the first processor, causes the first device to: receive a device identifier of a second device; generate a random number; transmit the random number to the second device; receive a first hash of a first combination of the random number and the device identifier from the second device; calculate a second hash of a second combination of the random number and the device identifier; compare the first hash to the second hash; and authenticate the second device that provided the first hash equal to the second hash. The first processor may further, upon authenticating the second device, cause the first device to receive payload data from the second device.

The first system also includes a second device comprising a second processor and a second memory storing computer-executable instructions that, when executed by the second processor, causes the second device to: transmit the device identifier of the second device to the first device; receive the random number from the first device; generate the first hash of the second combination of the random number and the device identifier; and transmit the first hash to the first device, wherein the first hash is communicated over the BACnet MS/TP network in a BACnet MS/TP message having a frame format comprising a header cyclic redundancy check (CRC) field extended in length by additional bytes to accommodate the length of the first hash, the additional bytes reallocated from the length of a data field of the frame format.

Optionally, in the first system, the additional bytes of the header CRC field may be 16 to 64 bytes, and the length of the data field may be 0 to 437 bytes, so that the maximum sum of the additional bytes and the length of the data field is 501 bytes. The payload data may be BACnet Data Expecting Reply or BACnet Data Not Expecting Reply. The first device may be a Variable Air Volume (VAV) Modular Assembly (VMA) controller of a building automation system (BAS), and the second device may be a remote sensor of the BAS, where the remote sensor may be a temperature sensor, a light sensor, an alarm controller, an elevator controller, a motion sensor, a heating, ventilating, and air-conditioning (HVAC) sensor, or a combination thereof.

Optionally, further aspects of the first system may include a machine learning processor engine utilizing at least one algorithm including a decision tree model, a random forest model, a logistic regression model, or a k-nearest neighbors model for detection and classification of an intrusion by the second device when the first hash is different from the second hash. The first processor may further cause the first device to transmit a notification to a building automation system operator when the first hash is different from the second hash.

In accordance with aspects of a fourth embodiment of the invention, a second system for device authentication on a BACnet MS/TP network includes a first device comprising a first processor and a first memory storing computer-executable instructions that, when executed by the first processor, causes the first device to: receive a physical unclonable function (PUF) of a second device; and authenticate the second device that provided the PUF equal to a known PUF of the device; and a second device comprising a second processor and a second memory storing computer-executable instructions that, when executed by the second processor, causes the second device to: transmit the physical unclonable function (PUF) of the second device to the first device, wherein the PUF is communicated over the BACnet MS/TP network in a BACnet MS/TP message having a frame format comprising a header cyclic redundancy check (CRC) field extended in length by additional bytes to accommodate the PUF length, the additional bytes reallocated from the length of a data field of the frame format. The first processor may further, upon authenticating the second device, cause the first device to receive payload data from the second device.

Optionally, in the second system, the additional bytes of the header CRC field may be 16 to 64 bytes, and the length of the data field may be 0 to 437 bytes, so that the maximum sum of the additional bytes and the length of the data field is 501 bytes. The payload data may be BACnet Data Expecting Reply or BACnet Data Not Expecting Reply. The first device may be a Variable Air Volume (VAV) Modular Assembly (VMA) controller of a building automation system (BAS), and the second device may be a remote sensor of the BAS, where the remote sensor may be a temperature sensor, a light sensor, an alarm controller, an elevator controller, a motion sensor, a heating, ventilating, and air-conditioning (HVAC) sensor, or a combination thereof.

Optionally, further aspects of the second system may include a machine learning processor engine utilizing at least one algorithm including a decision tree model, a random forest model, a logistic regression model, or a k-nearest neighbors model for detection and classification of an intrusion by the second device when the PUF is different from the known PUF. The first processor may further cause the first device to transmit a notification to a building automation system operator when the PUF is different from the known PUF.

Still other aspects, features, and advantages of the invention are readily apparent from the following detailed description, illustrating a number of particular embodiments and implementations, including the best mode contemplated for carrying out the invention. The invention is also capable of other and different embodiments, and its details can be modified in various respects, all without departing from the spirit and scope of the invention. Accordingly, the drawings and description are to be regarded as illustrative in nature, and not as restrictive.

BRIEF DESCRIPTION OF THE DRAWINGS

The numerous advantages of the present invention may be better understood by those skilled in the art by reference to the accompanying drawings in which:

FIG. 7 illustrates two algorithms for challenge-response based communication between two devices that utilize a random number for device authentication, according to some embodiments;

FIG. 8 illustrates an extended BACnet MS/TP frame format, according to some embodiments;

FIG. 9 is a flow chart illustrating an exemplary method for authenticating and authorizing devices on a BACnet MS/TP network, according to some embodiments;

DETAILED DESCRIPTION OF THE INVENTION

The invention summarized above may be better understood by referring to the following description, claims, and accompanying drawings. A description of an embodiment, set out below to enable one to practice an implementation of the invention, is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Descriptions of well-known functions and structures are omitted to enhance clarity and conciseness. The terminology used herein is for the purpose of describing particular embodiments only and is not intended to limit the present disclosure. As used herein, the singular forms "a," "an," and "the" are intended to include the plural forms as well, unless the context clearly indicates otherwise. Furthermore, the use of the terms a, an, etc. does not denote a limitation of quantity, but rather denotes the presence of at least one of the referenced items.

The use of the terms "first," "second," and the like does not imply any particular order, but they are included to identify individual elements. Moreover, the use of the terms first, second, etc. does not denote any order of importance, but rather the terms first, second, etc. are used to distinguish one element from another. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

Device Communication on a BACnet MS/TP Network

Figure 1:
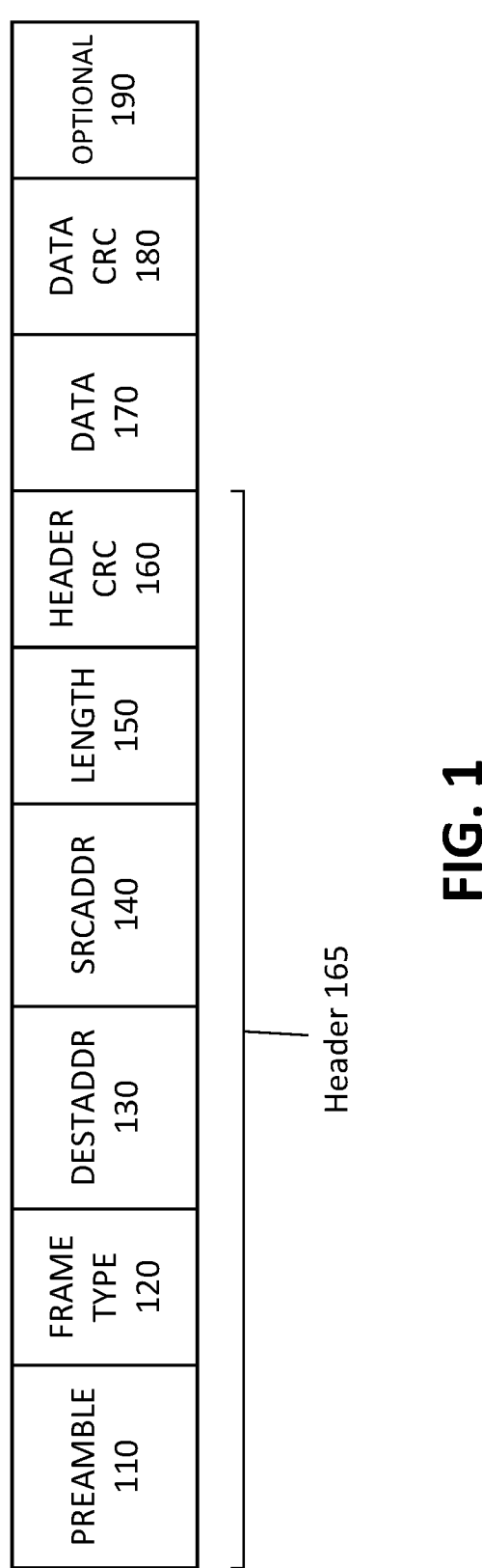
FIG. 1 illustrates the data format of a standard BACnet MS/TP data frame that is the basis for transformation and application of a modified BACnet MS/TP frame in an improved communication protocol, according to some embodiments.

FIG. 1 illustrates the data format of a standard BACnet MS/TP data frame 100. Devices on a BACnet MS/TP network communicate using such data frames. In accordance with certain aspects of an embodiment of the invention, this data frame also serves as the basis for a modified BACnet MS/TP frame in an improved communication protocol, as will be later described.

As shown in FIG. 1, each BACnet MS/TP data frame 100 consists of a header 165, a data field (DATA 170), and a checksum (e.g., HEADER CRC 160). The header 165 contains a PREAMBLE 110 and information about the frame (FRAME TYPE 120 and LENGTH 150), including the source (or sender) address (SCRADDR 140) and the destination (or receiver) address (DESTADDR 130). The BACnet MS/TP data frame is defined in the ASHRAE BACnet specification, ASHRAE 135-2020, which is herein incorporated by reference in its entirety.

The BACnet specification defines eight frame types, from 0 to 7. Frame types 8 through 127 are reserved by ASHRAE for specification improvements. Frame types 128 through 255 are reserved for vendor-specific frames. The defined frame types are: (00)—Token; (01)—Poll for Master; (02)—Reply to Poll for Master; (03)—Test Request; (04)—Test Response; (05)—BACnet Data Expecting Reply; (06)—BACnet Data Not Expecting Reply; and (07)—Reply Postponed. As discussed specifically herein, Frame Type (05) and Frame Type (06) are used by master nodes to convey the data parameter of a DL_UNITDATA.request that presents destination address, priority, and message code, waiting for a response from the destination node.

The data field (DATA 170) contains the actual data being transmitted, which can be any type of information, from temperature readings to control signals, for example. The HEADER CRC 160 (checksum) is used to ensure that the data frame has been transmitted correctly and has not been corrupted during transmission. A standard BACnet MS/TP frame will have at least one header cyclic redundancy check (e.g., HEADER CRC 160) error detection value to determine whether a packet has been correctly received. If the system has a Network-Layer Protocol Data Unit (NPDU), the BACnet MS/TP frame 100 will have a second 16-bit DATA CRC 180. The MS/TP frame integrity is checked by verifying the HEADER CRC 160 and DATA CRC 180. The BACnet MS/TP data frame 100 may also have an optional field 190 for padding (e.g., at most one octet of padding).

Figure 2:
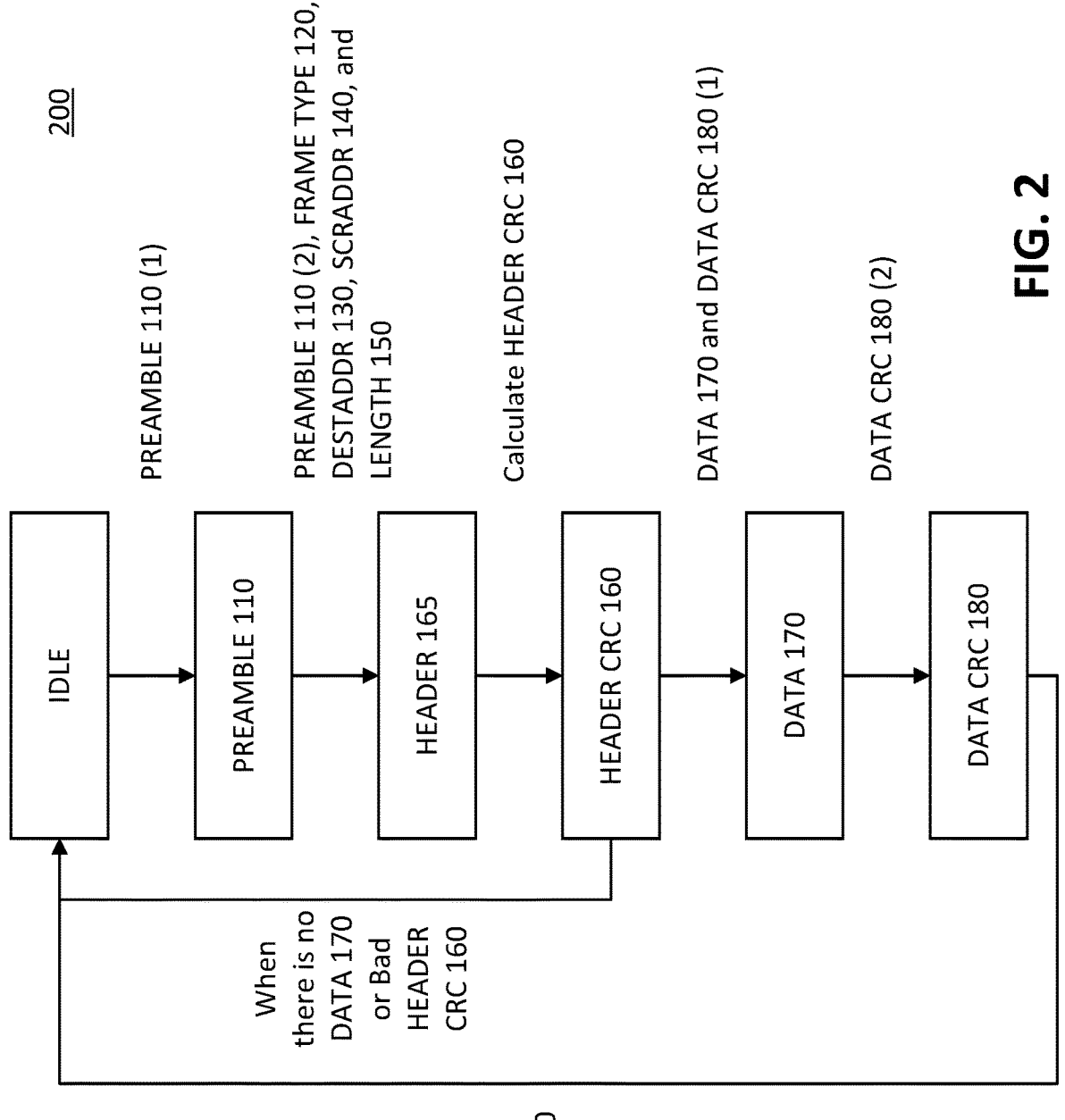
FIG. 2 illustrates a standard receive frame state machine in BACnet MS/TP.

FIG. 2 illustrates a standard receive frame state machine 200 in BACnet MS/TP. As shown in FIG. 2, the calculation of the HEADER CRC 160 includes the LENGTH 150, SCRADDR 140, DESTADDR 130, FRAME TYPE 120, and PREAMBLE 110. The LENGTH 150 field indicates the number of octets in the NPDU, up to 501 octets. Knowing the HEADER CRC 160, which is public knowledge, an adversary may use the LENGTH 150 field to corrupt the data. Leveraging this vulnerability, an adversary can craft any packet and send it to the BACnet system. The system will then calculate the HEADER CRC 160 to check for an error, but the system will let the adversary's malicious packet through as long as the HEADER CRC 160 is validated. Thus, with a standard BACnet MS/TP data frame 100, there is effectively no authentication check as long as the HEADER CRC 160 is correct.

Normal MS/TP Network Traffic

On MS/TP networks, there are two types of messages: Overhead and Application MS/TP messages. Overhead messages are Token and Poll for Master messages. Application MS/TP messages carry payloads such as BACnet Data Expecting Reply or BACnet Data Not Expecting Reply. Furthermore, in the BACnet application layer, there are eight types of Protocol Data Units: Confirmed-Request, Unconfirmed-Request, Simple-ACK, Error, Complex-ACK, Segment-ACK, Abort, and Reject.

When a device wants to transmit data on the MS/TP network, it must first wait for a token to be granted by the master device. The token is a special packet that allows the device to transmit data on the network. Once the device has the token, it can transmit a data frame, for example, data frame 100. The other devices on the network receive the data frame and check the CRC(s) (Header CRC 160 and, if available, Data CRC 180) to ensure that each has been transmitted correctly. If the data frame is valid, the receiving device can process the data and respond if necessary.

Figure 3:
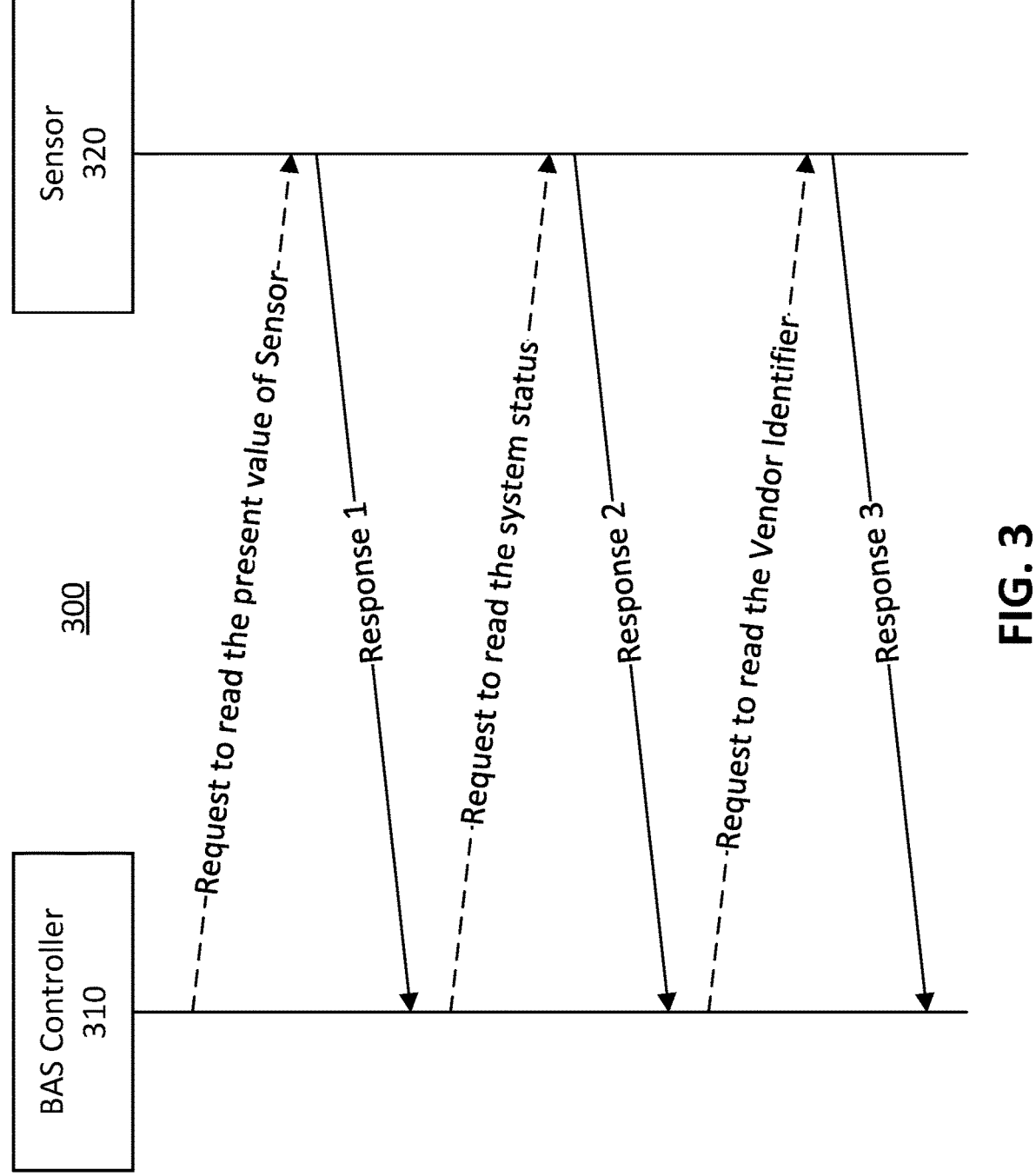
FIG. 3 is a sequence diagram illustrating the typical flow of MS/TP traffic.

FIG. 3 is a sequence diagram 300 illustrating the typical flow of MS/TP traffic. The communication is described in terms of the BACnet MS/TP protocol. This protocol is described in ASHRAE 135-2020, ASHRAE 135-2016 Errata, and ASHRAE IC 135-2016-14, which are incorporated herein by reference in their entirety. The Frame Type determines what the various nodes on an MS/TP network do after receiving the data frame. In this scenario, for example, a BAS controller 310, e.g., a Variable Air Volume (VAV) Modular Assembly (VMA) controller, acts as a client and requests a service such as the Read Property service from a sensor 320 device, e.g., a temperature sensor, and uses a Frame Type (05), Confirmed-Request protocol data unit (PDU) type (e.g., a "Request to read the present value of Sensor"), and waits for a response. Next, the sensor 320 uses Frame Type (06), Complex-ACK PDU type to reply to Frame Type (05) and sends data (e.g., Response 1) back to the BAS controller 310. A BACnet MS/TP physical layer packet is then captured via an RS-485 cable.

Abnormal MS/TP Network Traffic

Figure 4:
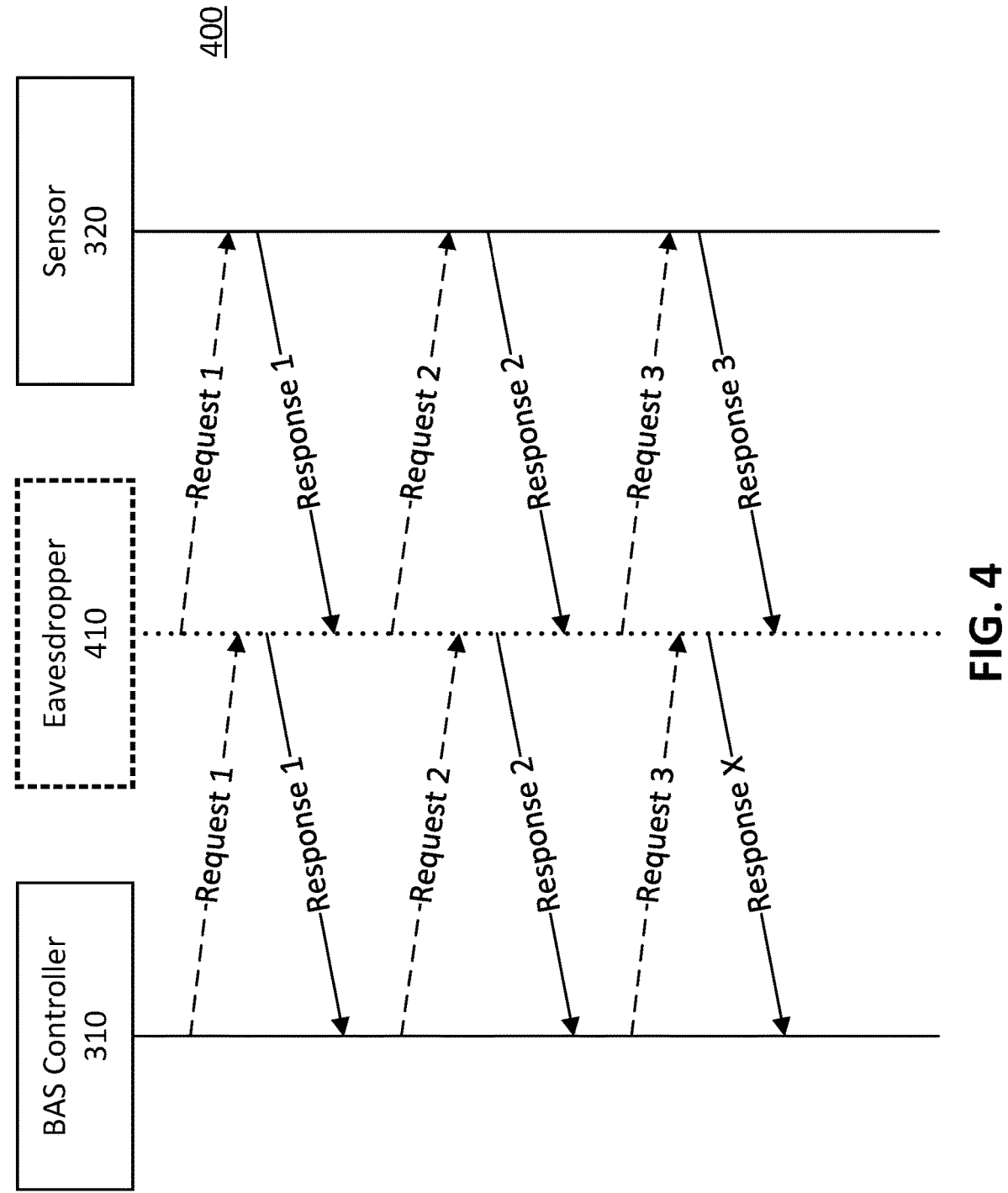
FIG. 4 is a sequence diagram illustrating an example of abnormal MS/TP traffic.

In contrast to the normal traffic pattern depicted in FIG. 3, FIG. 4 is a sequence diagram 400 illustrating an example of abnormal MS/TP traffic. FIG. 4 illustrates similar flow to FIG. 3 except an adversary with physical access to the BACnet MS/TP network is inserted between the BAS controller 310 and the sensor 320 as a "man-in-the-middle" adversary, according to one traffic flow example. Two attack models and scenarios including such a man-in-the-middle adversary, represented as an "eavesdropper" in these examples, are described below and depicted in FIGS. 5 and 6.

As illustrated in FIG. 4, eavesdropper 410 can pass messages between BAS controller 310 and sensor 320 without BAS controller 310 or sensor 320 knowing of eavesdropper 410's existence. For example, if BAS controller 310 sends Request 1, eavesdropper 410 can pass Request 1 on to sensor 320. If sensor 320 sends back Response 1, eavesdropper 410 can pass Response 1 on to BAS controller 310. In these cases, if BAS controller 310 sends a request package that is not known or not available, then sensor 320 will respond with an error message. Assuming eavesdropper 410 knows the communication pattern, eavesdropper 410 will also respond with an error message. However, eavesdropper 410 can also send a different message X (e.g., Response X).

In the case of FIG. 4, the eavesdropper 410 controls the communication response over MS/TP. Eavesdropper 410 first listens and learns the communication pattern of normal communication between BAS controller 310 and sensor 320 as BAS controller 310 and sensor 320 communicate back and forth, as shown in FIG. 3. Then, anytime BAS controller 310 requests a service, eavesdropper 410 will intercept it. For example, a VMA controller sends a Frame Type (05), and a temperature sensor will return a Frame Type (06). The Frame Type (06) only gives back what Frame Type (05) is requesting, such as present value, object type, object identifier, system status, or other types of services. Instead, an eavesdropper will craft a package and return it to the VMA controller and the sensor.

Figure 5:
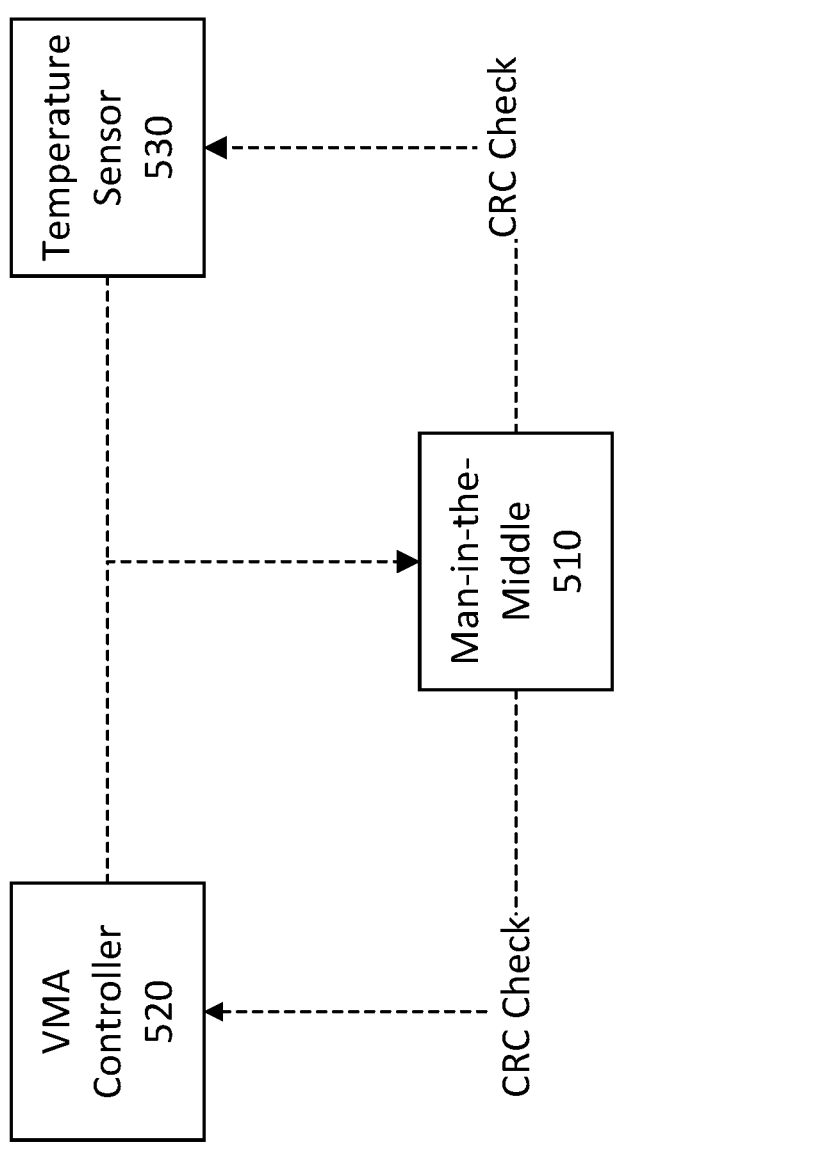
FIG. 5 illustrates an example attack scenario on a BACnet MS/TP network in which an eavesdropper (man-in-the-middle) tries to intercept a normal communication between two devices.

FIG. 5 illustrates an example of a first attack scenario 500 on a BACnet MS/TP network in which an eavesdropper (Man-in-the-Middle 510) tries to intercept a normal communication between two devices, e.g., VMA controller 520 and temperature sensor 530. Man-in-the-Middle 510 acts as a fake device on the MS/TP network and intercepts normal communication between these two devices. Man-in-the-Middle 510 will eavesdrop, analyze the normal data traffic, and intercept the data traffic in the middle of the communication. Man-in-the-Middle 510 will play both roles of the VMA controller 520 and the temperature sensor 530. In conventional systems, a BACnet operator will not be able to recognize the Man-in-the-Middle 510 and will assume that VMA controller 520 and temperature sensor 530 are communicating, despite Man-in-the-Middle 510 facilitating normal communication.

For example, an eavesdropping Man-in-the-Middle 510 wants to change the temperature sensor 530's present value. Therefore, if a VMA controller 520 requests the temperature sensor 530 to ReadProperty, instead of sending a ReadProperty service, the eavesdropping Man-in-the-Middle 510 will send a WriteProperty service to the temperature sensor 530. Similarly, when the temperature sensor 530 responds on behalf of the temperature sensor 530, a Man-in-the-Middle 510 will craft a different packet that the VMA controller 520 can understand.

Figure 6:
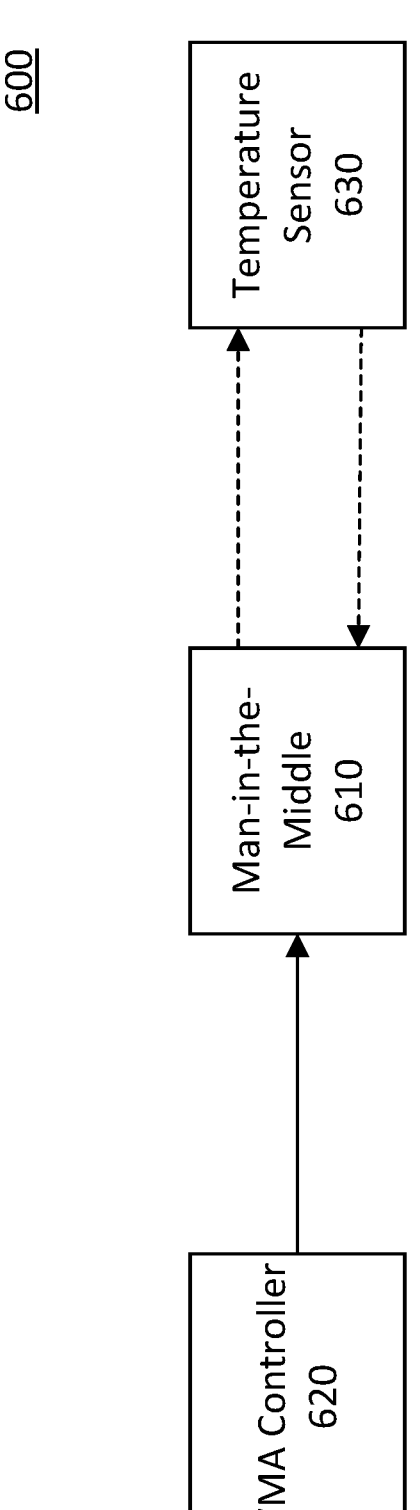
FIG. 6 illustrates an example attack scenario on a BACnet MS/TP network in which an eavesdropper gains access to the BACnet MS/TP network by spoofing the identifier of a building controller.

FIG. 6 illustrates an example of a second attack scenario 600 on a BACnet MS/TP network in which an eavesdropper (Man-in-the-Middle 610) gains access to the BACnet MS/TP network by spoofing the identifier of a building controller, e.g., VMA controller 620. Here, an eavesdropper essentially crafts a package and becomes one of the VMA controller 620 or temperature sensor 630 devices in the network. In this example, the eavesdropping Man-in-the-Middle 610 will take the role of the VMA controller 620; therefore, the temperature sensor 630 communicates with the eavesdropping Man-in-the-Middle 610.

Specifically, when the VMA controller 620 makes a request, instead of getting the request packet to the temperature sensor, Man-in-the-Middle 610 will intercept the request packet and then send a message to the temperature sensor 630. On the other side, when the response package comes back from the temperature sensor 630 to the Man-in-the-Middle 610, Man-in-the-Middle 610 will never send the response package back to the VMA controller 620. In this case, Man-in-the-Middle 610 gains access to the MS/TP network by spoofing the identifier of the VMA controller 620. To do this, when the VMA controller 620 sends the first package, Man-in-the-Middle 610 will intercept the entire first package as the VMA controller 620 requests. At this point, Man-in-the-Middle 610 learns the protocol from the request package, including the identification of the device that sent the request package. Thus, Man-in-the-Middle 610 can start crafting a substitute package as soon as Man-in-the-Middle 610 knows the VMA controller 620's identification on the network.

BACnet is Traditionally Vulnerable to Spoofing Attacks

Confidentiality is limited in a BACnet MS/TP network because the network requires physical access. Communication with other devices on a BACnet MS/TP network requires that entities be able to identify each other. Thus, for a device, including an adversary device, to communicate with other devices on the BACnet MS/TP network, it needs only some broadcasting identifier (ID). The BACnet standard requires that every BACnet device on the network have a unique ID that can be shared across the network. On the MS/TP network, that ID can be retrieved from the device's MAC address. For instance, as shown above, a VMA controller can communicate with a temperature sensor without being physically connected as long as each knows how to address each other by a unique ID. The same goes for a third-party eavesdropper that knows how to address each of the other devices. Further, BACnet MS/TP communication is not encrypted by default, and all packets are communicated in plaintext.

Features Available on the BACnet MS/TP Network for Identification Purposes Include:

Who-is, I-Am: The remote device management service category includes the BACnet application layer service. The device object identifier and network address of BACnet devices are determined using this service. I-Am is used to respond to Who-Is service requests, but they can also be sent out at any time, for instance, at device startup.

Discover: This command may be used on a BACnet client console to send messages to a BACnet server, which will display a list of the client's connected devices.

ReadProperty: This is one of the object access services categories in BACnet's application layer service. The goal of this service is to read (request) the value of a single BACnet object. The ReadProperty request contains BACnet-Confirmed-Request PDU to make a request. A response will include either BACnet-Complex ACK-PDU, which means a response will be sent back with data, or BACnet-Error-PDU, which means a response will be sent back with an error type.

BACnet is vulnerable to spoofing attacks because there is no authentication and authorization on the MS/TP network. As shown above, it is possible for unauthorized devices on the network to make fake packets that cause other authorized devices to broadcast their messages. BACnet MS/TP messages are also vulnerable to interception, alteration, and replay. The Cyclic Redundancy Check (CRC) field used in the BACnet MS/TP network prevents propagation mistakes, not malicious data manipulation. An attacker can alter the data and re-compute the CRC or use mathematical manipulation to get around the CRC. Header and data CRC checks can pass without any real authentication and data integrity checks. Further, even malformed packets cannot be assumed to lack authenticity or data integrity. Packets with checksum errors may indicate a physical problem with the connection of two devices, not usually a security issue. In typical MS/TP traffic, malformed packets may be caused by faulty RS-485 wiring or noise on the wire, for example.

Given these challenges, a countermeasure is needed to improve BACnet MS/TP communication. In some embodiments, a countermeasure focuses on device authentication and access control to ensure that only known and authorized systems can exchange information on the BACnet MS/TP network. This countermeasure can ensure that only devices with proper authentication and authorization on the MS/TP network can communicate. The countermeasure makes it impossible for untrusted devices to connect to the MS/TP network and communicate with other BACnet devices without authenticating themselves. Some aspects of the countermeasure provide methods to protect BACnet devices on the MS/TP network that need to verify their identity before being granted access to communicate.

Challenge-Response Based Authentication

FIG. 7 illustrates two algorithms for challenge-response based communication between two devices that utilize a random number for device authentication, according to some embodiments. As shown in FIG. 7, one way to solve the device authentication problem without breaking the MS/TP protocol is to authenticate with zero data transfer in the first round of communication between two devices, a first device and a second device. After authentication is complete, the devices can transfer data. Device authentication with zero data transfer can be achieved with two algorithms. A first algorithm 710 is performed at the second device, e.g., a client. A second algorithm 720 is performed at the first device, e.g., a server. The first device, e.g., the server that serves as an authenticator, which tries to authenticate the second device that joins the MS/TP network, will send a random number (randA←X) to the second device. The second device will add the random number to its device ID, hash it, and return the hash value (HashB) to the first device (e.g., the authenticator). The authenticator, aware of the device ID of the second device and the random number the authenticator sent, can calculate the hash (HashA) and compare the calculated hash (HashA) with the hash (HashB) received from the second device. If the authenticator determines that HashA equals HashB, the authenticator authenticates the second device and can receive data from the second device. If the authenticator determines that HashA does not equal HashB, authentication fails, and the authenticator can transmit a notification to a BAS controller and/or operator. In this way, the authentication process can identify a potential adversary and prevent infiltration on the network.

This authentication method is more secure than the current MS/TP communication flow, regardless of the known device IDs in the network, because the use of the random number allows a BACnet device that joins the network to share a hash value of its device ID plus a random number for authentication purposes. That hash value can be validated with another hash by the receiver. The communication flow no longer must rely on only known device IDs. Thus, an adversary will now see only the hash value in the communication channel and will be unable to read a unique ID and pose as a fake device with the unique ID. Since the hash is a one-way function, an adversary will never be able to do a back-calculation to determine the unique ID.

Hardware-Based Authentication Using Physical Unclonable Functions (PUF)

Authentication generates the initial layer of trust between two MS/TP network devices. Gassend et al. first proposed Physical Unclonable Functions (PUFs) as a hardware-based security primitive. See Gassend et al., *Controlled Physical Random Functions and Applications*, January 2008, ACM Transactions on Information and System Security, 10(4): 3. PUFs can be used as a hardware solution for IIoT identification and authentication. Recent works on device authentication using PUFs, including Sham-soshoara et al., discuss the advantages of PUF-based device authentication methods and show a list of current techniques in the IoT field. See, e.g., Alireza Sham-soshoara, Ashwija Korenda, Fatemeh Afghah, and Sherali Zeadally, *A survey on physical unclonable function (PUF)-based security solutions for Internet of Things*, 2020, Computer Networks 183, 107593. PUFs make use of device manufacturing variances to provide a unique ID of a device based on the manufacturing variances of the device itself. A PUF is thus akin to a device fingerprint.

PUFs allow for the storage of keys as well as the authentication of devices. On the MS/TP network, PUFs may be used for secure device authentication. A PUF's role on the MS/TP network is to establish identification between master and slave devices using the BACnet protocol. A PUF can generate a challenge-response. A PUF can also be used to measure the physical layer properties of the devices to create a device ID. For example, a first device, e.g., a server, can send a challenge to a second device, e.g., a client, for authentication, and the second device can deliver a response to be authenticated. Due to differences in the second device's physical features from every other device, the PUF can generate a challenge-response combination that is unique to the second device.

Although the issues of device authentication can be solved with the help of hardware-based authentication techniques such as using PUFs, the small size of the bytes in the header CRC in the BACnet MS/TP frame makes this use of PUFs challenging. A challenge-response type of authentication using PUFs requires a long sequence of data for the device ID that must be communicated in the standard BACnet MS/TP data frame format of FIG. 1. Using the standard MS/TP frame format could require narrowing the PUF sequence to accommodate the header CRC length of 8-bits. Unfortunately, narrowing the PUF sequence to 8-bits could be easy to break using a brute force attack and defeat the purpose of using a PUF. A solution is needed to mitigate this potential security issue while allowing for the use of a PUF for device authentication.

Extending the Header CRC

All BACnet device types can provide device authentication. BACnet can now support related communication by adding several new object types and services. Rather than creating a new and separate security layer in the BACnet protocol, the security functionality can be implemented by extending the capabilities of the MS/TP frame format.

In some embodiments, a countermeasure for MS/TP network intrusion comprises improving device authentication on the BACnet MS/TP network by changing the header CRC to include additional bytes. For example, the header CRC can be extended to accommodate a PUF. In turn, the MS/TP protocol can be improved to include a security technique using the extended CRC for better device authentication. For example, referring again to the standard MS/TP frame format in FIG. 1, a BACnet Data Expecting Reply or BACnet Data Not Expecting Reply frame's data segment can be between 0 and 501 octets long. The header CRC of the MS/TP frame format can be extended by using some of the 501 available bytes of data for the header CRC.

FIG. 8 illustrates an extended BACnet MS/TP frame format 820, compared to the standard MS/TP frame format 810, according to some embodiments. PUF can be used as an extendable hash function within the header CRC 830 for device authentication, for example. PUF can be used to generate a number of bits needed for device authentication in the header CRC 830 of the extended frame format 820. A certain number of bits can be chosen to use in the extended header CRC 830 of the extended frame format 820 and the remainder can be discarded. For improved security using device authentication, at least an additional 16-64 bytes can be used in the header CRC 830, for example, taken from the data 840 field (normally up to 501 bytes), which would then be allocated 0-437 bytes, for example. The maximum total of the additional bytes added to the header CRC 830 and the narrowed data 840 field equals 501 bytes.

Methods for Authenticating and Authorizing Devices on a BACnet MS/TP Network

FIG. 9 is a flow chart 900 illustrating an exemplary method for authenticating and authorizing a device on a BACnet MS/TP network using a random number authentication process, according to some embodiments. The method of FIG. 9 is performed by an authenticating device of a building automation system, for example. The authenticating device can be (or is otherwise termed in the art as) a server, an automation server, a field server, a master device, a building controller, a BAS controller, such as a VMA controller, a field controller, an MS/TP device, a programmable controller, a field panel, or another device for remote device management, which may be vendor specific, for example. Devices to be authorized and/or authenticated include, for example, sensor devices, such as a temperature sensor, a light sensor, an alarm controller, an elevator controller, a motion sensor, a heating, ventilating, and air-conditioning (HVAC) sensor, an access/security controller, a switch, an actuator, and/or a combination thereof, which may be remote controllable as applicable to building automation systems.

In step 910, the authenticating device receives a device identifier of a device attempting to authenticate on a BACnet MS/TP network ("target device").

In step 920, the authenticating device generates a random number and transmits that random number to the target device.

In step 930, the authenticating device receives, in an extended header CRC field, a first hash of a combination of the random number and the device identifier from the target device, which generated the first hash. The first hash is communicated from the target device over the BACnet MS/TP network in a BACnet MS/TP message having a frame format comprising the header CRC field extended in length by additional bytes to accommodate the length of the first hash, the additional bytes being reallocated from the length of a data field of the frame format.

In step 940, the authenticating device, knowing both the random number it sent and the device identifier it received from the target device, calculates a second hash of the combination of the random number and the device identifier.

In step 950, the authenticating device then compares the first hash that it received from the target device to the second hash that it calculated.

If the first hash matches (equals) the second hash, in step 960, the authenticating device authenticates the target device.

Once the target device is authenticated, the authenticating device can then receive payload data from the target device. If the first hash does not match (does not equal) the second hash, the authenticating device will not authenticate the target device or receive payload data from the target device.

Optionally, the authenticating device can cause a notification to be sent to a building controller and/or operator indicating that an authentication process has failed and providing additional information regarding the failure (e.g., timestamp, location, message content, device identification, system configuration information, etc.).

Figure 10:
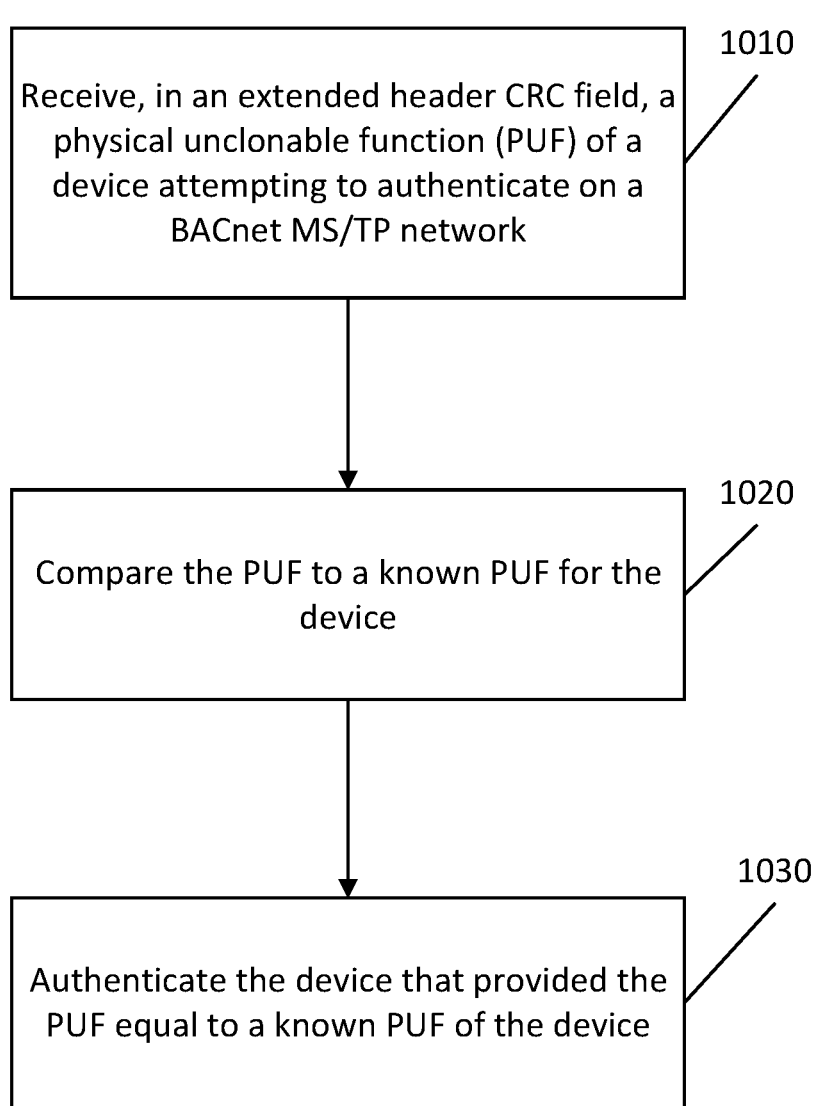
FIG. 10 is a flow chart illustrating another exemplary method for authenticating and authorizing devices on a BACnet MS/TP network, according to some embodiments.

FIG. 10 is a flow chart 1000 illustrating another exemplary method for authenticating and authorizing devices on a BACnet MS/TP network using a PUF authentication process, according to some embodiments. The method of FIG. 10 is performed by an authenticating device of a building automation system, for example. The authenticating device can be (or is otherwise termed in the art as) a server, an automation server, a field server, a master device, a building controller, a BAS controller, such as a VMA controller, a field controller, an MS/TP device, a programmable controller, a field panel, or another device for remote device management, which may be vendor specific, for example. Devices to be authorized and/or authenticated include, for example, sensor devices, such as a temperature sensor, a light sensor, an alarm controller, an elevator controller, a motion sensor, a heating, ventilating, and air-conditioning (HVAC) sensor, an access/security controller, a switch, an actuator, and/or a combination thereof, which may be remote controllable as applicable to building automation systems.

In step 1010, the authenticating device receives, in an extended header CRC field, a physical unclonable function (PUF) of a device attempting to authenticate on a BACnet MS/TP network ("target device"). In step 1020, the authenticating device compares the received PUF to a known PUF of the device. In step 1030, the authenticating device authenticates the target device when the authenticating device determines that the PUF is equal to the known PUF in the network.

Once the target device is authenticated, the authenticating device can then receive payload data from the target device. If the PUF does not match (does not equal) the known PUF, the authenticating device will not authenticate the target device or receive payload data from the target device.

Optionally, the authenticating device can cause a notification to be sent to a building controller and/or operator indicating that an authentication process has failed and providing additional information regarding the failure (e.g., timestamp, location, message content, device identification, system configuration information, etc.).

Intrusion Detection System

Figure 11:
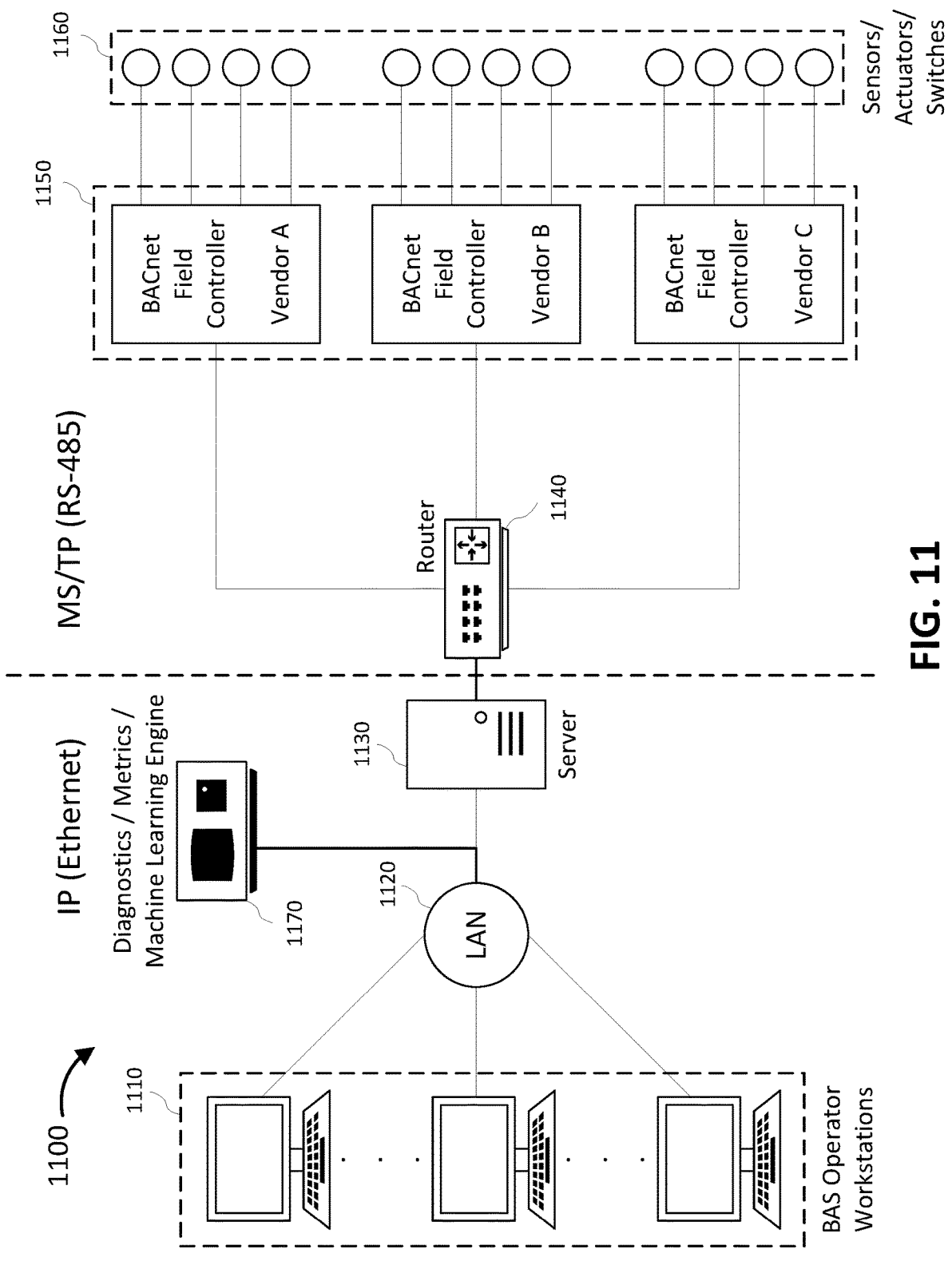
FIG. 11 is a diagram of an exemplary system for authenticating and authorizing devices and detecting and preventing intrusions on a BACnet MS/TP network, according to some embodiments.

FIG. 11 is a diagram of an exemplary system 1100 for authenticating and authorizing devices and detecting and preventing intrusions on a BACnet MS/TP network of a building automation system (BAS), according to some embodiments. The system 1100 illustrates a BAS that can include, or integrate aspects of, an Intrusion Detection System (IDS). An IDS can be used to identify different types of cyber-attacks. To identify cyber-attacks, system 1100 can implement multi-classification algorithms to classify attack instances into several attack categories. Various machine learning methods can be used to for identification and classification of intrusions. Machine learning techniques can include tree-based models, including decision trees, random forests, logistic regression, and k-nearest neighbors (KNN), for example.

The IDS can be trained using various training attack models, including, for example, the attack scenarios and models as illustrated in FIGS. 4, 5, and 6. The IDS can implement the method illustrated in FIG. 9 to identify a cyber-attack. Specifically, the IDS can implement a physical security technique using the extended BACnet MS/TP frame format 820, as described herein, to efficiently detect attacks and verify the trustworthiness of devices in an BACnet MS/TP network.

As illustrated in FIG. 11, one or more BAS Operator Workstations are networked via Internet protocol (IP) over Ethernet in a building automation system. The BAS Operator Workstations may be networked over a local area network (LAN) 1120, for example. One or more servers 1130 provides processing, analysis, and computation services, message generation, message conversion from BACnet IP to BACnet MS/TP, and data storage, for example, for the BAS. Router 1140 directs BACnet MS/TP messages from server 1130 (from the BAS Operator Workstations 1110) to BACnet field controllers 1150. BACnet field controllers 1150 may be sourced from different device vendors (for example, vendors A, B, and C). BACnet field controllers 1150 can communicate with, query, and control various sensors, actuators, and switches 1160 of the BAS. BACnet field controllers 1150 can send BACnet MS/TP messages back to the router 1140, which can communicate the messages to the server 1130 for processing, analysis, and computation that are appropriate for the message exchange.

Further processing may be performed by diagnostics/metrics/machine learning engine 1170, which may be a separate computing device on the LAN 1120 or may be integrated into server 1130, for example. Diagnostics/metrics/machine learning engine 1170 can implement aspects of the IDS that detect and prevent intrusions into the BAS. Diagnostics/metrics/machine learning engine 1170 can analyze communication data across the BACnet MS/TP network to determine sources of communication errors and diagnose the communication errors for potential intrusions, e.g., to determine whether errors are due to an adversarial attack versus a physical problem with a connection between two devices or noise on an RS-485 wire. For example, diagnostics/metrics/machine learning engine 1170 can perform the machine learning algorithm(s) comprising a decision tree model, a random forest model, a logistic regression model, and/or a k-nearest neighbors model for detection and classification of an intrusion by the second device when the first hash is different from the second hash, as determined in the method of FIG. 9.

Diagnostics/metrics/machine learning engine 1170 can also score intrusions to quantify their severity. Diagnostics/metrics/machine learning engine 1170 can further calculate metrics to quantify the effectiveness of a system's intrusion detection and/or prevention. Diagnostics/metrics/machine learning engine 1170 can quantify risk of intrusions based on historical learned data collected from a particular IDS's diagnostics/metrics/machine learning engine 1170 or from like systems. Risk assessments can be correlated to type of sensor, location of sensor, vendor, or other configuration details, for example.

Exemplary Computer System

Figure 12:
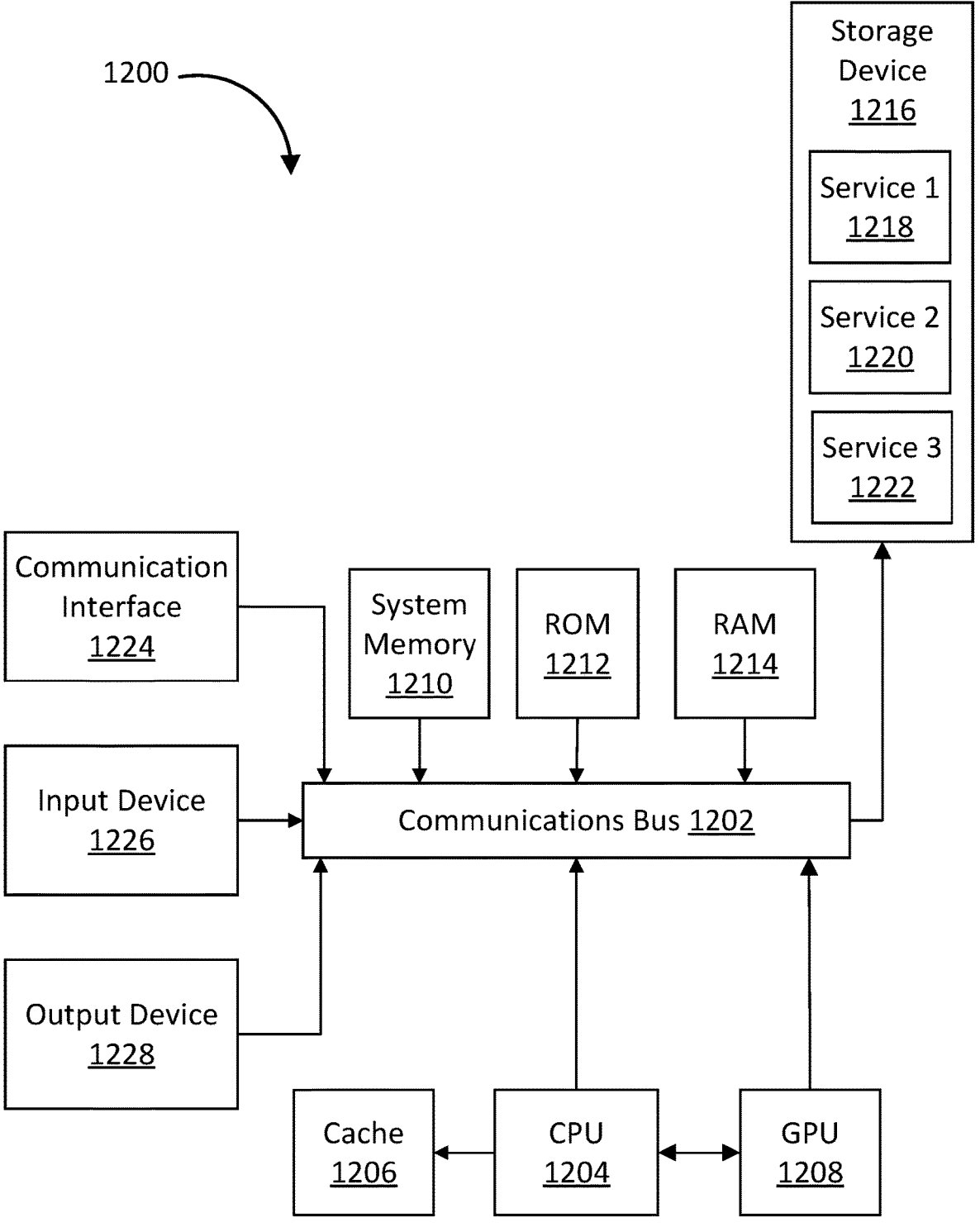
FIG. 12 illustrates an exemplary computer system suitable for implementing the methods and systems described herein.

FIG. 12 illustrates an exemplary computer system 1200 suitable for implementing the methods and systems described herein. The Intrusion Detection System and aspects implementing the physical security techniques described herein may take the form of computer system 1200, although variations thereof may readily be implemented by persons skilled in the art as may be desirable for any particular installation. In each such case, one or more computer systems 1200 may carry out the foregoing methods as computer code.

Computer system 1200 includes a communications bus 1202, or other communications infrastructure, which communicates data to other elements of computer system 1200. For example, communications bus 1202 may communicate data (e.g., text, graphics, video, other data) between communications bus 1202 and an I/O interface to input device 1226 and output device 1228, which may include a display, a data entry device such as a keyboard, touch screen, mouse, or the like, and any other peripheral devices capable of entering and/or viewing data as may be apparent to those skilled in the art.

Further, computer system 1200 includes at least one processor, which may include central processing unit (CPU) 1204 and general processing unit (GPU) 1208, and which may comprise a special purpose or a general purpose digital signal processor. CPU 1204 may communicate with cache 1206 for temporary processing memory. CPU 1204 can include one or more hardware or software service(s), such as services 1218, 1220, 1222 stored in storage device 1216, configured to control the one or more processors of CPU 1204. A software service can perform one or more functions when the one or more processors execute(s) the software associated with the service. In some embodiments, a service is a program or a collection of programs that carry out a specific function. In some embodiments, a service can be considered a server. CPU 1204 can alternatively, or additionally, include a special-purpose processor having software instructions incorporated into the processor design.

Still further, computer system 1200 includes a system memory 1210, which may include or interface with random access memory ("RAM") 1214, read-only memory ("ROM") 1212, one or more mass storage devices, or any combination of tangible, non-transitory memory, for example. Still further, computer system 1200 may include a secondary memory, which may comprise a hard disk, a removable data storage unit, or any combination of tangible, non-transitory memory. For example, computer system 1200 may include storage device 1216.

Finally, computer system 1200 may include a communication interface 1224, such as a modem, a network interface (e.g., an Ethernet card or cable), a communications port, a PCMCIA slot and card, a wired or wireless communications system (such as Wi-Fi, Bluetooth, Infrared, and the like), local area networks, wide area networks, intranets, and the like.

Each of system memory 1208, ROM 1212, RAM 1214, storage device 1216, communication interface 1224, and combinations of the foregoing may function as a non-transitory computer usable storage medium or computer readable storage medium to store and/or access computer software including computer instructions. For example, computer programs or other instructions may be loaded into the computer system 1200 such as through a removable data storage device (e.g., a floppy disk, ZIP disks, magnetic tape, portable flash drive, optical disk such as a CD, DVD, or Blu-ray disk, Micro Electro Mechanical Systems ("MEMS"), and the like). Thus, computer software including computer instructions may be transferred from, e.g., a removable storage or hard disc to secondary memory, or through communications bus 1202 to system memory 1210.

Communication interface 1224 allows software, instructions and data to be transferred between the computer system 1200 and external devices or external networks. Software, instructions, and/or data transferred by the communication interface 1224 are typically in the form of signals that may be electronic, electromagnetic, optical or other signals capable of being sent and received by communication interface 1224. Signals may be sent and received using a cable or wire, fiber optics, telephone line, cellular telephone connection, radio frequency ("RF") communication, wireless communication, or other communication channels as will occur to those of ordinary skill in the art.

Computer programs, when executed, allow one or more processors of computer system 1200 to implement the methods discussed herein for the detection and prevention of various cyber-attacks on BACnet devices in communication on a BACnet MS/TP network, according to computer software including instructions. Computer system 1200 may perform any one of, or any combination of, the steps of any of the methods described herein. It is also contemplated that the methods according to the present invention may be performed automatically or may be accomplished by some form of manual intervention.

The computer system 1200 is provided only for purposes of illustration, such that the invention is not limited to this specific embodiment. Persons having ordinary skill in the art are capable of programming and implementing the instant invention using any computer system.

Further, computer system 1200 may, in certain implementations, comprise a handheld device and may include any small-sized computing device, including by way of non-limiting example a cellular telephone, a smartphone or other smart handheld computing device, a personal digital assistant, a laptop or notebook computer, a tablet computer, a hand held console, an MP3 player, or other similarly configured small-size, portable computing device as may occur to those skilled in the art.

An Intrusion Detection System may in an exemplary configuration, be implemented in a cloud computing environment for carrying out the methods described herein. That cloud computing environment uses the resources from various networks as a collective virtual computer, where the services and applications can run independently from a particular computer or server configuration making hardware less important. The cloud computer environment includes at least one user computing device. The client computer may be any device that may be used to access a distributed computing environment to perform the methods disclosed herein and may include (by way of non-limiting example) a desktop computer, a portable computer, a mobile phone, a personal digital assistant, a tablet computer, or any similarly configured computing device.

A client computer preferably includes memory such as RAM, ROM, one or more mass storage devices, or any combination of the foregoing. The memory functions as a computer readable storage medium to store and/or access computer software and/or instructions.

A client computer also preferably includes a communications interface, such as a modem, a network interface (e.g., an Ethernet card), a communications port, a PCMCIA slot and card, wired or wireless systems, and the like. The communications interface allows communication through transferred signals between the client computer and external devices including networks such as the Internet and a cloud data center. Communication may be implemented using wireless or wired capability, including (by way of non-limiting example) cable, fiber optics, telephone line, cellular telephone, radio waves or other communications channels as may occur to those skilled in the art.

Such client computer establishes communication with the one or more servers via, for example, the Internet, to in turn establish communication with one or more cloud data centers that implement an Intrusion Detection System. A cloud data center may include one or more networks that are managed through a cloud management system. Each such network includes resource servers that permit access to a collection of computing resources and components of the Intrusion Detection System, which computing resources and components can be invoked to instantiate a virtual computer, process, or other resource for a limited or defined duration. For example, one group of resource servers can host and serve an operating system or components thereof to deliver and instantiate a virtual computer. Another group of resource servers can accept requests to host computing cycles or processor time, to supply a defined level of processing power for a virtual computer. Another group of resource servers can host and serve applications to load on an instantiation of a virtual computer, such as an email client, a browser application, a messaging application, or other applications or software.

The cloud management system may comprise a dedicated or centralized server and/or other software, hardware, and network tools to communicate with one or more networks, such as the Internet or other public or private network, and their associated sets of resource servers. The cloud management system may be configured to query and identify the computing resources and components managed by the set of resource servers needed and available for use in the cloud data center. More particularly, the cloud management system may be configured to identify the hardware resources and components such as type and amount of processing power, type and amount of memory, type and amount of storage, type and amount of network bandwidth and the like, of the set of resource servers needed and available for use in the cloud data center. The cloud management system can also be configured to identify the software resources and components, such as type of operating system, application programs, etc., of the set of resource servers needed and available for use in the cloud data center.

In accordance with still further aspects of an embodiment of the invention, a computer program product may be provided to provide software to the cloud computing environment. Computer products store software on any computer useable medium, known now or in the future. Such software, when executed, may implement the methods according to certain embodiments of the invention. By way of non-limiting example, such computer usable mediums may include primary storage devices (e.g., any type of random access memory), secondary storage devices (e.g., hard drives, floppy disks, CD ROMS, ZIP disks, tapes, magnetic storage devices, optical storage devices, MEMS, nanotech storage devices, etc.), and communication mediums (e.g., wired and wireless communications networks, local area networks, wide area networks, intranets, etc.). Those skilled in the art will recognize that the embodiments described herein may be implemented using software, hardware, firmware, or combinations thereof.

The cloud computing environment described above is provided only for purposes of illustration and does not limit the invention to this specific embodiment. It will be appreciated that those skilled in the art are readily able to program and implement the invention using any computer system or network architecture.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A method of authenticating a device on a building automation and control master-slave/token-passing (BACnet MS/TP) network, the method comprising:

receiving, by a processor of an authenticating device, a device identifier of the device;

generating, by the processor, a random number;

transmitting, by the processor, the random number to the device;

receiving, by the processor, a first hash of a combination of the random number and the device identifier from the device;

calculating, by the processor, a second hash of the combination of the random number and the device identifier;

comparing, by the processor, the first hash to the second hash; and authenticating, by the processor, the device that provided the first hash equal to the second hash, wherein the first hash is communicated over the BACnet MS/TP network in a BACnet MS/TP message having a frame format comprising a header cyclic redundancy check (CRC) field extended in length by additional bytes to accommodate the length of the first hash, the additional bytes reallocated from the length of a data field of the frame format.

2. The method according to claim 1, wherein the additional bytes of the header CRC field are 16 to 64 bytes, the length of the data field is 0 to 437 bytes, and the maximum sum of the additional bytes and the length of the data field is 501 bytes.

3. The method according to claim 1, further comprising, upon authenticating the device, receiving, by the processor, payload data from the device.

4. The method according to claim 3, wherein the payload data is BACnet Data Expecting Reply or BACnet Data Not Expecting Reply.

5. The method according to claim 1, wherein the authenticating device is a Variable Air Volume (VAV) Modular Assembly (VMA) controller of a building automation system (BAS), and the device is a remote sensor of the BAS.

6. The method according to claim 5, wherein the remote sensor comprises a temperature sensor, a light sensor, an alarm controller, an elevator controller, a motion sensor, a heating, ventilating, and air-conditioning (HVAC) sensor, or a combination thereof.

7. The method according to claim 1, further comprising transmitting a notification to a building automation system operator when the first hash is different from the second hash.

8. A system for device authentication on a building automation and control master-slave/token-passing (BACnet MS/TP) network, the system comprising:

a first device comprising a first processor and a first memory storing computer-executable instructions that, when executed by the first processor, causes the first device to:

receive a device identifier of a second device;

generate a random number;

transmit the random number to the second device;

receive a first hash of a first combination of the random number and the device identifier from the second device;

calculate a second hash of a second combination of the random number and the device identifier;

compare the first hash to the second hash; and authenticate the second device that provided the first hash equal to the second hash; and a second device comprising a second processor and a second memory storing computer-executable instructions that, when executed by the second processor, causes the second device to:

transmit the device identifier of the second device to the first device;

receive the random number from the first device;

generate the first hash of the second combination of the random number and the device identifier; and transmit the first hash to the first device, wherein the first hash is communicated over the BACnet MS/TP network in a BACnet MS/TP message having a frame format comprising a header cyclic redundancy check (CRC) field extended in length by additional bytes to accommodate the length of the first hash, the additional bytes reallocated from the length of a data field of the frame format.

9. The system according to claim 8, wherein the additional bytes of the header CRC field are 16 to 64 bytes, the length of the data field is 0 to 437 bytes, and the maximum sum of the additional bytes and the length of the data field is 501 bytes.

10. The system according to claim 8, further comprising computer-executable instructions that, when executed by the first processor, causes the first device to:

upon authenticating the second device, receive payload data from the second device.

11. The system according to claim 10, wherein the payload data is BACnet Data Expecting Reply or BACnet Data Not Expecting Reply.

12. The system according to claim 8, wherein the first device is a Variable Air Volume (VAV) Modular Assembly (VMA) controller of a building automation system (BAS), and the second device is a remote sensor of the BAS.

13. The system according to claim 12, wherein the remote sensor comprises a temperature sensor, a light sensor, an alarm controller, an elevator controller, a motion sensor, a heating, ventilating, and air-conditioning (HVAC) sensor, or a combination thereof.

14. The system according to claim 8, further comprising a machine learning processor engine utilizing at least one algorithm comprising a decision tree model, a random forest model, a logistic regression model, or a k-nearest neighbors model for detection and classification of an intrusion by the second device when the first hash is different from the second hash.

15. The system according to claim 8, further comprising computer-executable instructions that, when executed by the first processor, causes the first device to:

transmit a notification to a building automation system operator when the first hash is different from the second hash.

* * * * *